Dec. 30, 1924.

W. H. DENNETT ET AL 1,521,148

STORAGE APPARATUS

Filed June 21, 1920

5 Sheets-Sheet 1

INVENTORS
John M. Benjamin,
William H. Dennett

Dec. 30, 1924.

W. H. DENNETT ET AL 1,521,148

STORAGE APPARATUS

Filed June 21, 1920   5 Sheets-Sheet 2

INVENTORS
John M. Benjamin
William H. Dennett

Dec. 30, 1924.

W. H. DENNETT ET AL 1,521,148

STORAGE APPARATUS

Filed June 21, 1920

5 Sheets-Sheet 3

INVENTORS
John M. Benjamin
William H. Dennett

Dec. 30, 1924. 1,521,148
W. H. DENNETT ET AL
STORAGE APPARATUS
Filed June 21, 1920   5 Sheets-Sheet 5

INVENTORS.
John M. Benjamin.
William H. Dennett

Patented Dec. 30, 1924.

1,521,148

UNITED STATES PATENT OFFICE.

WILLIAM H. DENNETT, OF SWAMPSCOTT, AND JOHN M. BENJAMIN, OF BEVERLY, MASSACHUSETTS.

STORAGE APPARATUS.

Application filed June 21, 1920. Serial No. 390,441.

*To all whom it may concern:*

Be it known that we, WILLIAM H. DENNETT and JOHN M. BENJAMIN, citizens of the United States, residing at Swampscott and Beverly, respectively, in the county of Essex and State of Massachusetts, have invented a new and useful Improvement in Storage Apparatus, of which the following is a specification.

Our invention relates to that class of storage apparatus in which the contents of a receptacle are protected from a change of temperature by a surrounding chamber from which the air has been wholly or partially removed; and objects of our invention are to enable the receptacle to be opened to its full area of admission and when closed to be totally separated from the external atmosphere by a heat insulating envelope; to provide automatic means for removing air from the chamber surrounding the storage receptacle, in case of leakage; to enable the same apparatus to be used either for refrigerating or heating purposes, by the introduction of means for either heating or cooling; to automatically limit, to a predetermined amount, the pressure in the storage receptacle, when the apparatus is used for cooking under a pressure of saturated steam, thereby determining the maximum temperature in the storage receptacle; to provide means for easy access to the contents of the receptacle; and to provide a receptacle of such a shape that the ratio of the capacity to the weight shall be as large as possible for a given floor space and height. We attain these objects by the organization illustrated in the accompanying drawings, in which—

Figure 1:
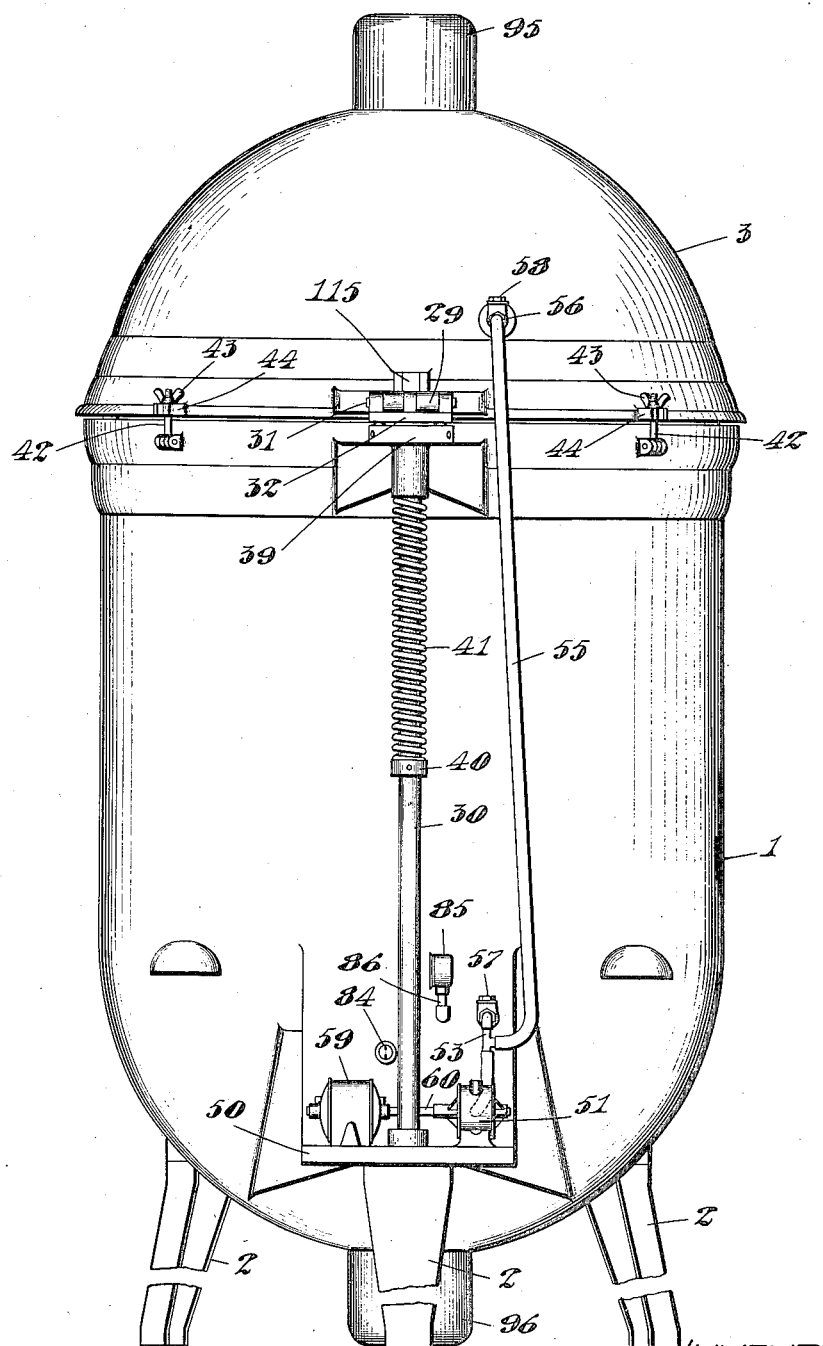
Figure 2:
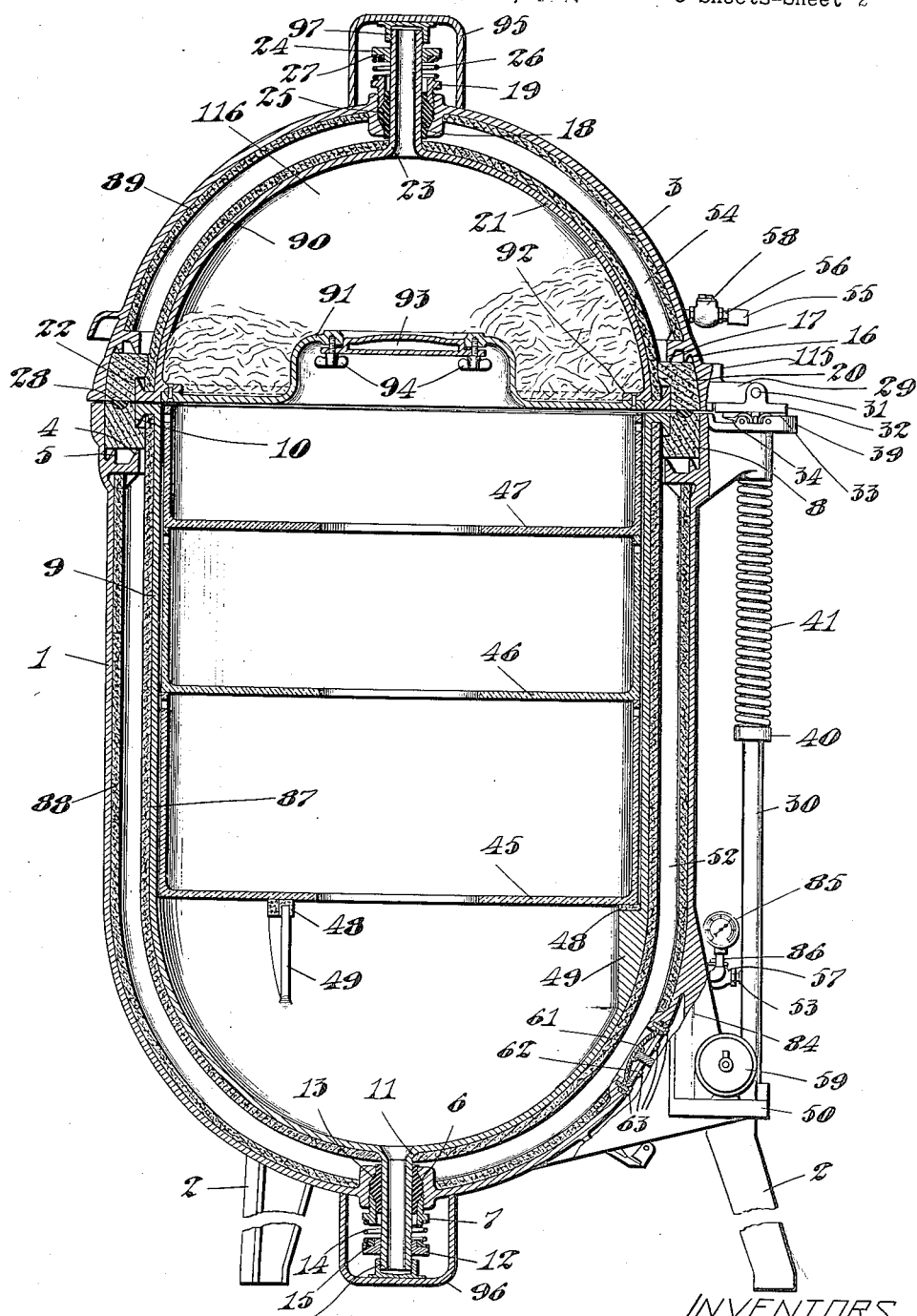
Figure 3:
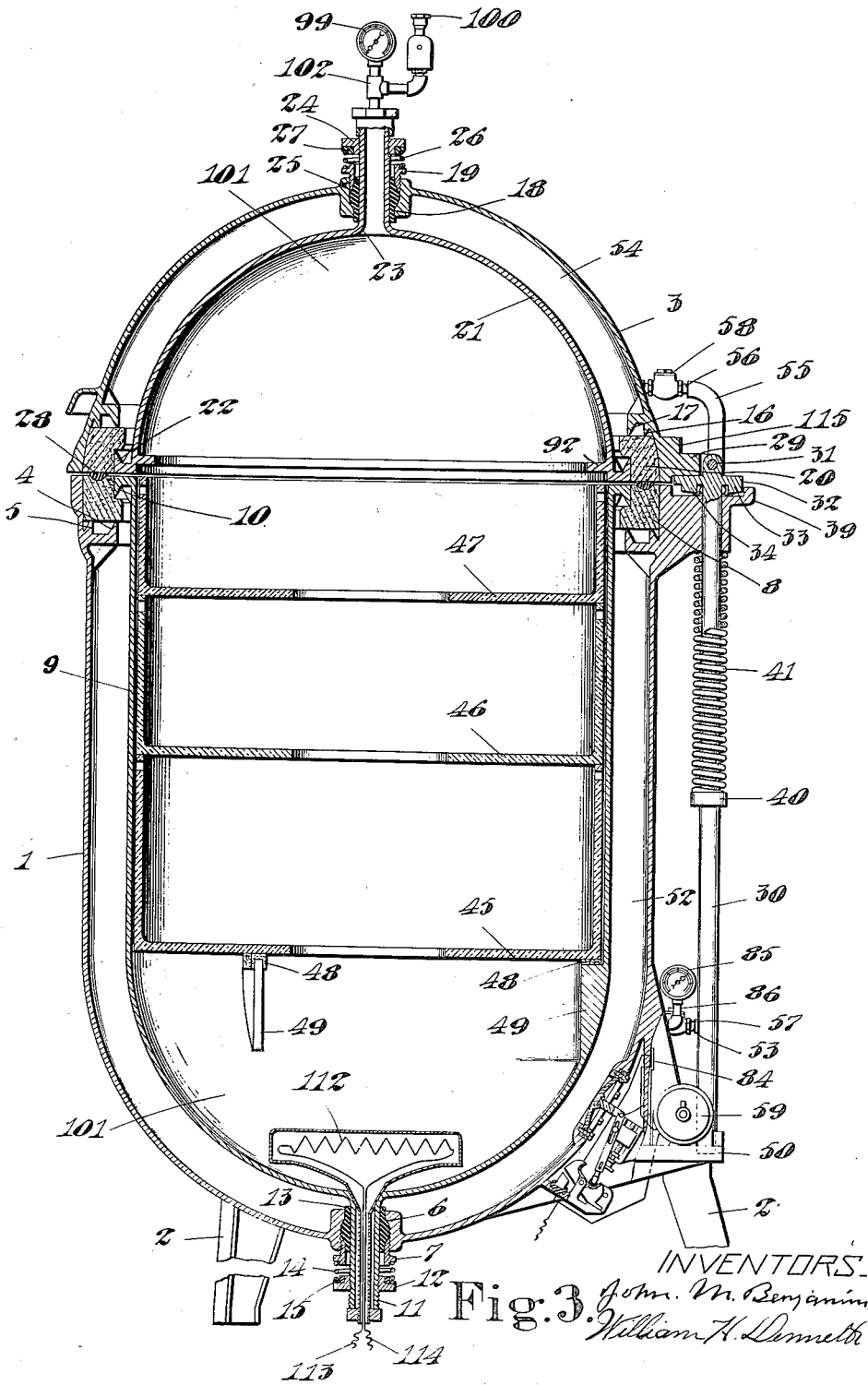
Figure 5:
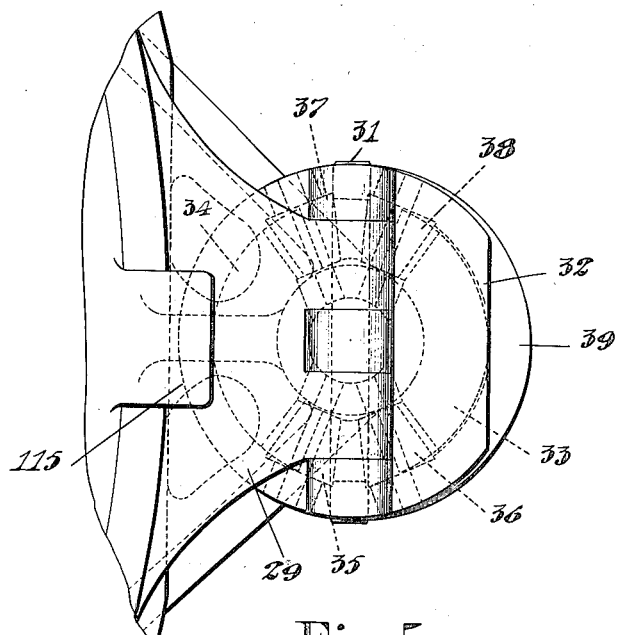
Figure 4:
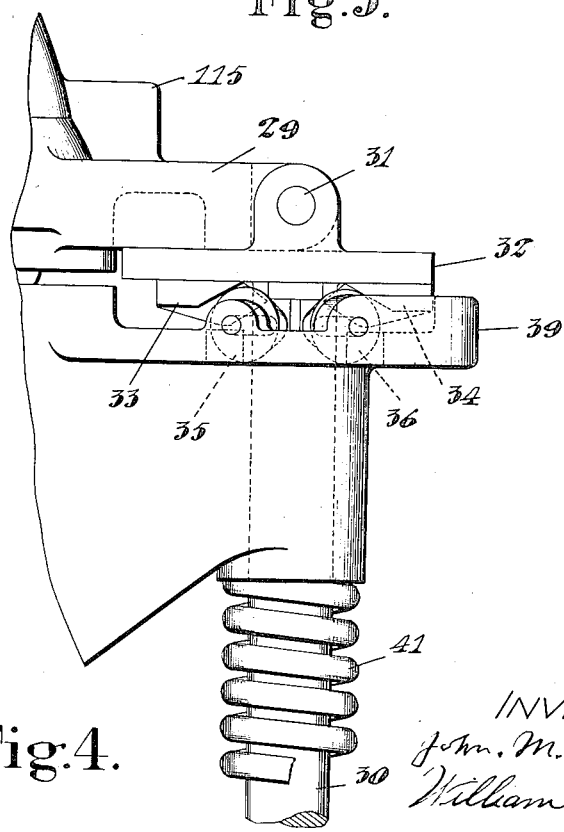
Figure 6:
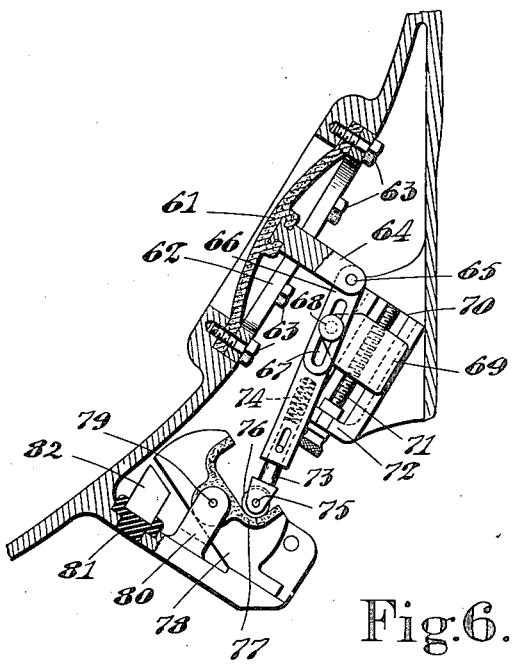
Figure 7:
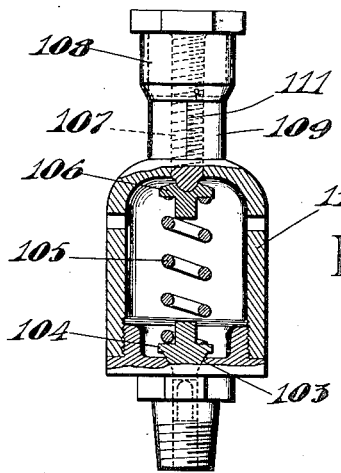
Figure 8:
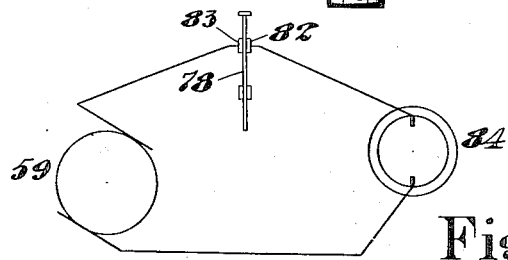

Figure 1 is a view of the apparatus in elevation; Fig. 2, a vertical section therethrough, as arranged for refrigerating purposes; Fig. 3, a vertical section, as arranged for heating purposes; Fig. 4, a detail view in elevation of the hinged connection between the upper and lower portions of the receptacle; Fig. 5, a plan view, in detail, of said hinged connection; Fig. 6, a detail view, in partial section, of the operating mechanism of the electrical switch, controlling the motor; Fig. 7, a view, in partial section, of the pressure-regulating valve used in the heating arrangement; and Fig. 8, a digrammatic view of the electrical connections of the motor. Similar numerals refer to similar parts throughout the several views.

A base or body 1, its legs 2—2—2, and cover 3 constitute the principal portions of the apparatus. The upper edge of the base 1 is provided with two vertical, sharp-edged annular flanges 4 and 5, and there is a hole 6, in the center of the bottom, which hole is of conical form at its upper end, and internally threaded at its lower end to receive a packing gland 7. Resting on top of the sharp-edged annular flanges 3 and 4 is a ring 8, which is made from a non-metallic substance of poor heat conductivity. Within the base 1 is a storage receptacle 9 of cylindrical form which is provided with a sharp-edged annular flange 10, resting upon the upper surface of the ring 8, and a hollow stem 11, the lower end of which extends through the hole 6 and is externally threaded to fit a nut 12. Between the stem 11 and the inner surface of the hole 6 is a packing member 13, made from a non-metallic substance of poor heat conductivity. The packing member 13 is compressed by the packing gland 7 sufficiently to make an air-tight joint between the stem 11 and the inner surface of the hole 6, and at the same time permit a relative movement between the stem 11 and the base 1, due to an unequal expansion of the two parts. Surrounding the stem 11 and between the packing gland 7 and the nut 12 is a helical spring 14, separated from the nut 12 by a non-metallic ring 15, which is of poor heat conductivity. The spring 14 is compressed by the nut 12 sufficiently to compress the ring 8 between the sharp-edged flange 10 of the storage receptacle 9 and the sharp-edged flanges 4 and 5 of the base 1 during all relative changes of temperature, thereby making, with the aid of the external unbalanced atmospheric pressure, an airtight joint between them.

The cover 3 is of hemispherical shape and is provided with two vertical, sharp-edged annular flanges 16 and 17, and also with a hole 18 in the center of the top, which hole is of conical form at its lower end, and internally threaded at its upper end to receive a packing gland 19. Underneath the two sharp-edged annular flanges 16 and 17 is a ring 20, made from a non-metallic substance of poor heat conductivity. Within the cover 3 is a hemispherical shell 21, which is provided with a sharp-edged vertical annular flange 22 in contact with the ring 20, and with a hollow stem 23, the upper end of which extends through the hole 18 in the cover 3, and is externally threaded to fit a nut 24. Between the stem 23 and the inner surface of the hole 18, in the cover 3, is a packing member 25 of poor heat conductivity and non-metallic. The packing member 25 is compressed, by the packing gland 19, sufficiently to make an air-tight joint between the stem 23 and the inner surface of the hole 18, and at the same time permit a relative movement between the stem 23 and the cover 3, due to an unequal expansion of the two parts. Surrounding the stem 23 and between the packing gland 19 and the nut 24 is a helical spring 26, separated from the nut 24 by a non-metallic ring 27 of poor heat conductivity. The spring 26 is compressed by the nut 24, sufficiently to compress the ring 20, between the sharp edges of the flanges 16 and 17 of the cover 3 and the sharp edge of the flange 22 of the hemispherical shell 21 during all relative changes of temperature, thereby making an air-tight joint between them. The ring 8 is provided with an annular groove, in which is a ring 28 of elastic material. The cover 3 has a hinge portion 29, movably connected to a vertical shaft 30 by a fulcrum pin 31. The shaft 30 is movably mounted on the base 1 to rotate and reciprocate vertically and is provided with a flange 32, on the under side of the depending edge of which are two cams 33 and 34, adapted, as the shaft is turned, to ride on rolls 35, 36, 37 and 38 rotatable on a bracket 39 of the base 1, and disposed in pairs symmetrically arranged on opposite sides of a line below and parallel to the axis of the pin 31, as viewed in Fig. 4. The cams 33 and 34 are also symmetrical with relation to the same line, and are identical in form at their front and rear portions, the forward end of one cam and the rear end of the other riding together over the rolls as the cover is turned about the axis of the shaft 30 in one direction. Rotation in the opposite direction merely reverses the action, an equal lifting effect being obtained in either case. On the shaft 30 is a collar 40. Between the collar 40 and the bracket 39 is a helical spring 41, under compression between the two. On the base 1 are pivoted eye-bolts 42, provided with nuts 43, which are adapted to engage the ears 44 of the cover 3.

Within the storage receptacle 9 are three annular shelves 45, 46 and 47, each having at its periphery an upwardly extending cylindrical wall. Shelf 45 is supported by three elastic cushions 48—48—48, resting on three brackets 49—49—49 of the storage receptacle 9. Shelf 46 rests upon the peripheral wall of the shelf 45, and shelf 47 rests similarly upon shelf 46. It is to be observed, that the cylindrical body and hemispherical ends of the receptacle approach closely to a maximum storage capacity, considering its weight, height and floor space occupied.

Upon a shelf 50 of the base 1 is mounted a rotary exhaust pump 51, the suction of which is connected by a pipe 53 to a vacuum chamber 52 formed in a space between the base 1 and receptacle 9, and by a flexible hose 55 and a pipe 56 to a vacuum chamber 54 between the cover 3 and shell 21. As used herein, a "vacuum" chamber is to be understood as one from which the air has been removed sufficiently to decrease its conduction of heat to a suitable extent for the end sought. In the pipe 53 is a check-valve 57, and in the pipe 56 is a check-valve 58. The pump 51 is directly connected to the shaft 60 of an electrical motor 59, also mounted upon the shelf 50, and is adapted to be rotated by it. In an opening in the base 1 is an elastic diaphragm 61, secured by a ring 62 attached to the base by screws 63. In the center of the diaphragm 61 and rigidly connected to it, is an arm 64, in the outer end of which is a pin 65. On the pin 65 is movably pivoted a lever 66, having a longitudinal slot 67 arranged to slide upon a fulcrum pin 68. The fulcrum pin is mounted upon a sliding member 69, adapted to be moved in a slot 70 in the base 1 by an adjusting screw 71 held in place by an ear 72 and threaded into the sliding member 69. Mounted in the lever 66 and adapted to slide therein is a plunger 73, under the pressure of a helical spring 74. Mounted upon a pivot 75 in the plunger 73 and adapted to rotate thereon is a wheel 76. The wheel 76 rests upon an insulating member 77 of a switch 78. The switch 78 is movably mounted upon a pin 79 in an ear 80 of the base 1. Mounted upon the base 1 is an insulating member 81, upon which are secured electrical terminals 82 and 83, between which the switch 78 is adapted to make an electrical connection. In the base 1 is a terminal connection 84, adapted to be connected to a source of electrical supply. One terminal of the connection 84 is connected to the terminal 82, and the other terminal of the connection 84 is connected to one terminal of the motor 59. The other terminal of the motor 59 is connected to the terminal 83. A vacuum gauge 85 is connected to the vacuum chamber 52 by a pipe 86.

When the apparatus is used for cooling purposes, the vacuum chambers 52 and 54 are lined with heat insulating coverings 87, 88, 89 and 90 of felt or other porous material, and a metallic partition 91 is riveted to a flange 92 of the shell 21. This partition has an opening in the center, which is closed by a cover 93, secured by thumb-screws 94—94. The stems 23 and 11 are covered by the non-metallic hoods 95 and 96, attached to nuts 97 and 98, which are screwed on to the stems 23 and 11, respectively.

When the apparatus is to be used for heating purposes, it is provided with a pressure gauge 99 and a relief valve 100, both connected to a chamber 101 within the shell and receptacle through a pipe 102 and the hollow stem 23. The relief valve consists of a conical valve seat 103 and a valve cover 104 held against the valve seat by a helical compression spring 105, acting against an abutment 106. This abutment is supported by a screw 107 integral with a hollow collar 108 surrounding a stem 109 projecting upwardly from a casing 110, into which stem the screw is threaded. This stem is provided with a graduated scale 111, over which the edge of the collar moves as it is rotated to vary the tension of the spring 105. The inner chamber 101 is provided with an electrical resistance 112, the insulated terminals of which, 113 and 114, pass through the hollow stem 11 to the source of electrical supply.

The operation of the apparatus is as follows: The terminal connection 84 is joined to a source of electrical supply; while the switch 78 is between the terminals 82 and 83, and the elastic diaphragm 61 is flat. The motor 59 then operates, driving the pump 51, thereby removing the air from the chambers 52 and 54 until the air pressure in the chamber 52 is reduced sufficiently to permit the external atmosphere to force the diaphragm 61 and the upper end of the lever 66, attached to it, inwardly, and the lower end of the lever 66 outwardly, as it swings about the fulcrum pin 68, until the wheel 76 passes across the fulcrum pin 79 and the switch 78 is removed from contact with the terminals 82 and 83, thereby breaking the motor circuit and stopping the motor and the pump. The atmosphere is prevented from re-entering the chambers 52 and 54 by the check-valves 57 and 58, respectively. The degree of exhaustion of the air in the chambers 52 and 54 may be fixed by the position of the fulcrum pin 68. The cover 3 is next turned, in a vertical plane about the fulcrum pin 31, until a projection 115 rests on the bracket 39. The weight of the cover, acting against the bracket 39 as a fulcrum, raises the shaft 30 as far as permitted by the pressure of the spring 41 exerted between the collar 40 and the bracket 39, thereby cushioning the blow when the cover is thrown back quickly. The same action on the spring takes place when the cover is closed, a portion of the elastic ring 28 then acting as a fulcrum. If it is desired to use the apparatus for cooling purposes, the cover 93 is removed, a quantity of ice is placed in the chamber 116, the cover replaced, the articles to be stored placed on the shelves 45, 46 and 47, and the cover closed. When the receptacle is opened for the admission or removal only of articles, the cover may be turned in a horizontal plane, using the shaft 30 as an axis, the cover being raised at the same time by the action of the cams 33 and 34 against the rolls 35, 36, 37 and 38, thereby relieving the friction between the cover and the elastic ring 28. When the receptacle is to be used for heating purposes, the partition 91 and the cover 93 are not used. The electrical resistance 112 is placed in the storage receptacle. The material to be heated is then placed upon the shelves and the cover fastened down by means of the bolts 42. The terminals of the electrical resistance 112 are next connected to a source of electrical supply until the temperature within the receptacle reaches the desired point, when the terminals of the resistance are disconnected from the source of supply. By setting the collar 108 at the right position to allow the valve 104 to be forced from its seat by the same pressure as that which actuates the lever 66, the moment of breaking the circuit of the resistance may be indicated by the escape of air or steam from the relief valve.

We claim:

1. In a storage apparatus, a storage receptacle including a body portion and a cover portion movably mounted thereon, a portion having independent inner and outer walls spaced to furnish a vacuum chamber, a separating member interposed between the walls, and means removed from the separating member for forcing the walls into engagement therewith.

2. In a storage apparatus, a storage receptacle including a body portion and a cover portion movably mounted thereon, a portion having independent inner and outer walls spaced to furnish a vacuum chamber, a separating member interposed between the walls, and spring means co-operating with the walls to force them into engagement with the separating member.

3. In a storage apparatus, a storage receptacle including a body-portion and a cover-portion removably mounted thereon, a portion having independent inner and outer walls spaced to furnish a vacuum chamber and having oppositely extending reduced projections, a separating member interposed between said projections, and means acting upon the walls to draw the projections into engagement with the separating member.

4. In a storage apparatus, two portions each surrounded by a vacuum chamber, and a hinge connecting the said parts and arranged to permit their relative movement in intersecting planes.

5. In a storage apparatus, an upper portion, a lower portion, a vertical hinge pin connecting the portions, a spring acting thereon, and a cam arranged to raise said upper portion against the force of the spring.

6. In a storage receptacle, separated walls between which is an intermediate vacuum space, packing material between the walls at one extremity of the space, and means at the opposite extremity of the space for drawing the walls into contact with the packing material.

7. In a storage apparatus, an upper portion, a lower portion, a packing ring between the portions, a vertical hinge connecting the portions, a spring acting thereon, and a cam arranged to raise the upper portion from the packing ring against the force of the spring.

8. In a storage apparatus, a storage receptacle having an inner wall and an outer wall with an intermediate vacuum chamber, said walls having projections extending oppositely and longitudinally of the walls, and a separating member engaged by the projections.

9. In a storage apparatus, a storage receptacle including a body portion and a cover portion movably mounted thereon, each portion having independent inner and outer walls spaced to furnish a vacuum chamber, separating members interposed between the walls, and a hinge connection between the portions at one side of the separating members, said members co-operating upon the closing of the receptacle about the hinge.

Signed at Swampscott, in the county of Essex and State of Massachusetts, this 17 day of June, 1920.

JOHN M. BENJAMIN.
WILLIAM H. DENNETT.